W. H. FRAZINE.
SHOCK ABSORBER.
APPLICATION FILED AUG. 29, 1914.
1,153,300.
Patented Sept. 14, 1915.
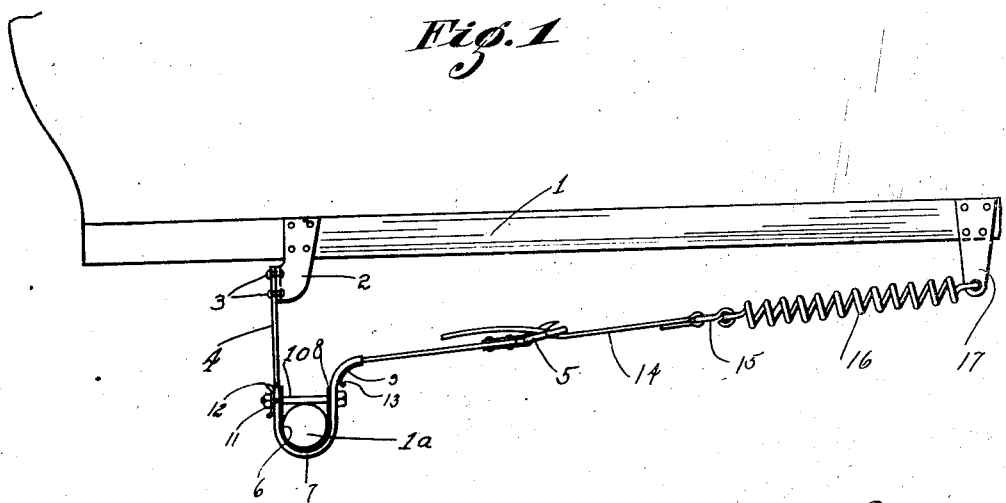
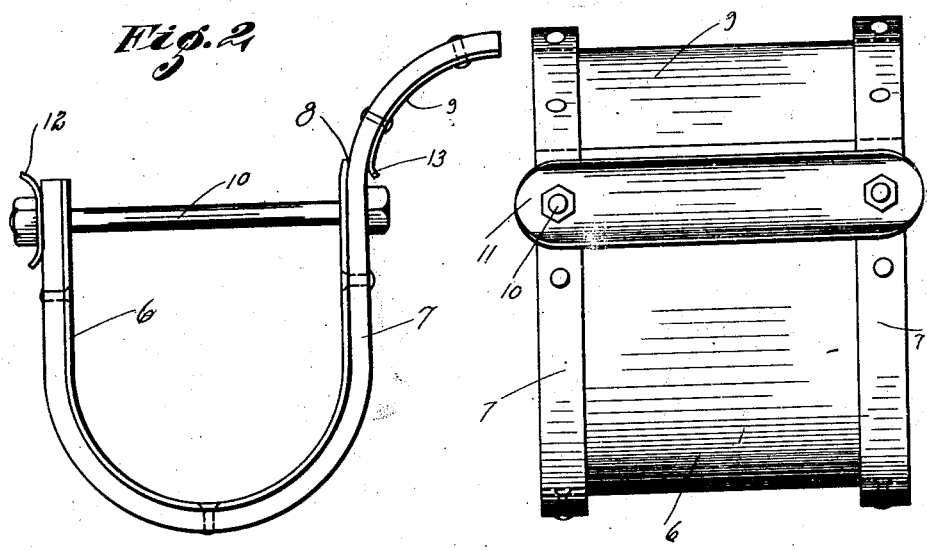
WITNESSES:
J. B. Webster
F. M. Blanchard
INVENTOR.
William H. Frazine
BY Jerry S. Webster
ATTORNEY

UNITED STATES PATENT OFFICE.

WILLIAM H. FRAZINE, OF MODESTO, CALIFORNIA.

SHOCK-ABSORBER.

1,153,300.

Specification of Letters Patent. Patented Sept. 14, 1915.

Application filed August 29, 1914. Serial No. 859,213.

*To all whom it may concern:*

Be it known that I, WILLIAM H. FRAZINE, a citizen of the United States, residing at Modesto, in the county of Stanislaus, State of California, have invented certain new and useful Improvements in Shock-Absorbers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in shock absorbers and is particularly adapted to reduce the sudden expansion of an automobile spring when the body of the automobile has been thrown upward by reason of striking some obstruction in the roadway. It is a well-known fact that automobile springs are generally broken upon the second movement of the spring, that is, the movement upward, and to overcome this tendency I have designed the hereinafter described device.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side view showing the device as applied between the axle and the lower frame member of the vehicle. Fig. 2 is a side view of the friction frame. Fig. 3 is an end view of the friction frame.

Referring now more particularly to the characters of reference on the drawings the numeral 1 indicates the lower frame member of a vehicle and the numeral 2 a bracket fastened thereto.

Fastened to the bracket 2 by means of rivets 3 I have provided a leather strap 4 of a sufficient length to pass down around the axle 1ª through the friction frame and over to a buckle fastened thereon as at 5. This frame has for its principal member a liner 6 to which are riveted the guides 7. This liner continues to the point 8 on the inside of the guides 7 and from thereon is placed below the guides 7 as at 9. To clamp this frame to the vehicle shaft I have provided bolts 10 running through both sides of the frame as shown. Upon one side of the frame I have provided a long washer plate 11 slightly turned up on the edges as at 12 for a purpose as will hereinafter appear. The liner 9 is also slightly turned back as at 13. Disposed in the buckle 5 is another strap 14 having a series of holes therein to provide for any necessary adjustment. To the end of this strap 14 I have fastened a hook 15 to which is connected a spring 16 fastened at its extreme end to a bracket 17 rigidly riveted to the frame 1 of the vehicle.

When the vehicle strikes an obstruction in the road the axle 1ª will be moved upwardly thereby allowing the spring 16 to pull the strap around through the frame. Upon the immediate return of the axle to its normal position the strap and spring will have to return to their normal position and in doing this will have to act against the additional pull of the spring and also the friction of the frame as before described. The friction will be less when the shaft moves toward the frame of the vehicle because the strap being more or less stiff will tend to force itself down around the friction frame and this slack will be immediately taken up by the spring 16. In this way a greater amount of friction is obtained upon the upward movement of the shaft than upon the downward movement.

From the foregoing description it will be readily seen that I have produced such a device as substantially fulfil the object of the invention as set forth he in.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising the combination with a vehicle, of a frame secured to the axle of said vehicle, such frame comprising a pair of U-shaped guides spaced apart, the upper ends of such U-shaped guides extending vertically with respect to said vehicle, a curved portion projecting substantially at right angles from one end of each of said U-shaped guide members, a liner plate on the upper edges of said U-shaped guide members, a liner plate on the under edges of said curved portions, a strap secured to the under portion of said vehicle and projecting vertically downwardly therefrom and through said U-shaped guide members and thence over the liner plate on said curved portions, and a resilient member extending substantially horizontally below said vehicle and connected with said strap, as described.

2. A device of the character described comprising the combination with a vehicle, of a U-shaped guide mounted on the axle of said vehicle and having an extended guide portion on one side projecting at substantially right angles thereto, a strap secured to said vehicle and extending vertically downwardly therefrom and through said U-shaped guide member and thence through said extended guide member whereby said strap will project from said extended guide member in a substantially horizontal position beneath said vehicle, and a resilient member extending in a substantially horizontal position beneath said vehicle and connected with said strap, as described.

In testimony whereof I affix my signature in presence of two witnesses.

WILLIAM H. FRAZINE.

Witnesses:
STEPHEN N. BLEWETT,
FLOYD M. BLANCHARD.